(12) United States Patent
Kwak

(10) Patent No.: US 10,607,425 B2
(45) Date of Patent: Mar. 31, 2020

(54) VEHICLE ELECTRONIC LOGGING DEVICE (ELD) HOUR-OF-SERVICE (HOS) AUDIT AND CORRECTION GUIDANCE SYSTEM AND METHOD OF OPERATING THEREOF

(71) Applicant: TrueLite Trace, Inc., Milpitas, CA (US)

(72) Inventor: Sung Bok Kwak, Milpitas, CA (US)

(73) Assignee: Truelite Trace, Inc., San Jose, CA (US)

( * ) Notice: Subject to any disclaimer, the term of this patent is extended or adjusted under 35 U.S.C. 154(b) by 73 days.

(21) Appl. No.: 15/885,731

(22) Filed: Jan. 31, 2018

(65) Prior Publication Data

US 2019/0236863 A1 Aug. 1, 2019

(51) Int. Cl.
*G07C 5/08* (2006.01)
*H04L 29/08* (2006.01)
*G07C 5/00* (2006.01)

(52) U.S. Cl.
CPC ......... *G07C 5/0808* (2013.01); *G07C 5/0858* (2013.01); *G07C 5/008* (2013.01); *H04L 67/12* (2013.01)

(58) Field of Classification Search
None
See application file for complete search history.

(56) References Cited

U.S. PATENT DOCUMENTS

| | | | |
|---|---|---|---|
| 2013/0297095 A1* | 11/2013 | Kwak | G06Q 10/0639 701/1 |
| 2017/0287322 A1* | 10/2017 | Drake | G08C 17/02 |
| 2018/0211170 A1* | 7/2018 | Domnick | G06Q 10/06311 |
| 2018/0268623 A1* | 9/2018 | Ambrose | G07C 5/085 |

* cited by examiner

*Primary Examiner* — Abdhesh K Jha
(74) *Attorney, Agent, or Firm* — Invent Capture, LLC; Samuel S. Cho

(57) ABSTRACT

A vehicle electronic logging device (ELD) hour-of-service (HoS) audit and correction guidance system provides preemptive pre-violation and violation alerts and interactive vehicle log entry correction guidance for commercial vehicle operations regulatory compliance. The vehicle ELD HoS audit and correction guidance system incorporates in-vehicle sensor data output values that are machine-interpreted by a vehicle OBD device, a driver's on-duty or off-duty confirmation entries, and other driver log adjustments to analyze an electronically-generated vehicle log. Subsequently, the system determines whether some log entries are anomalous and indicative of driver log entry or adjustment errors, which may result in commercial vehicle regulatory violation if left uncorrected. The vehicle ELD HoS audit and correction guidance system then prompts and assists a driver to correct anomalous log entries to prevent regulatory violations via interactive driver auditing-mode interfaces, multimedia alerts, sirens, and multi-language voice guidance.

12 Claims, 10 Drawing Sheets

A System Block Diagram of a Commercial Fleet-Level ELD HoS Audit and Correction Guidance System

100

A System Block Diagram of a Commercial Fleet-Level ELD HoS Audit and Correction Guidance System A Driver Auditing-Mode Screenshot from an ELD HoS Audit and Correction Guidance System

200

A Driver Auditing-Mode Screenshot from an ELD HoS Audit and Correction Guidance System
300

A Driver Status Log Edit Screenshot from an ELD HoS Audit and Correction Guidance System

A Driver Auditing-Mode Screenshot After Driver-Initiated Corrections from an ELD HoS Audit and Correction Guidance System

500

A Vehicle and Driver Selection Interface Screenshot from an ELD HoS Audit and Correction Guidance System

600

A Commercial Driver Electronic Logging Current Status Menu Screenshot from an ELD HoS Audit and Correction Guidance System

700

A System Block Diagram Example for a Vehicle Electronic Logging Device (ELD)

800

An Embodiment of an ELD Log Audit and Correction Module in an ELD HoS Audit and Correction Guidance System An Example of a Portable Electronic Device Incorporating a Commercial Vehicle-Specific ELD HoS Audit and Correction Guidance Application(s)

1000

VEHICLE ELECTRONIC LOGGING DEVICE (ELD) HOUR-OF-SERVICE (HOS) AUDIT AND CORRECTION GUIDANCE SYSTEM AND METHOD OF OPERATING THEREOF

BACKGROUND OF THE INVENTION

The present invention generally relates to one or more electronic systems for commercial vehicle operations recordkeeping, analysis, and communications. More specifically, various embodiments of the present invention relate to machine-initiated guidance of vehicle electronic logging device hour-of-service audit and correction interfaces for regulatory compliance of commercial vehicles and commercial drivers. Furthermore, various embodiments of the present invention also relate to machine-generated intelligent voice guidance components for hour-of-service audit and correction for regulatory compliance associated with commercial vehicles and drivers.

Commercial vehicle operations and commercial vehicle drivers are increasingly regulated and legally mandated by state, federal, national, and/or municipal governments to record and submit proof of commercial vehicle operating history, driver resting period compliance, vehicle condition inspections, and vehicle maintenance compliance in an effort to enhance public roads safety. For example, in the United States, a commercial vehicle driver is increasingly obligated by various regulatory compliance measures to record and update his or her vehicle operating status and legally-mandated resting activities between vehicle operations. Failure to meet such regulatory requirements in vehicle operating logs may result in significant penalties imposed on commercial vehicle drivers and their employers.

In one example of regulatory requirements on a commercial vehicle driver, the driver is required to take a mandatory thirty-minute break after eight hours of consecutive driving or active on-duty tasks associated with the commercial vehicle (i.e. "30-minute required break per consecutive 8-hour drive"). The commercial vehicle driver may also be required to abide by other mandatory rest requirements, such as a consecutive rest period of thirty-four hours for every non-consecutive sixty hours of active on-duty driving per week (i.e. "60-hour cycle limit"), or a consecutive rest period of ten hours, including eight hours of sleep, for every non-consecutive eleven hours of active on-duty driving (i.e. "11-hour driving limit"). A regulatory violation intentionally or inadvertently caused by a commercial vehicle driver may result in stiff penalties or fines to the commercial vehicle driver and a related vehicle fleet operator.

In the past, the regulatory compliance for mandatory driver rest periods and vehicle maintenance for commercial vehicle operations was primarily satisfied by recording driver logs on paper (i.e. in form of "vehicle driver log" documents). In recent years, electronic driver activity-logging devices have further assisted commercial vehicle drivers to enter or verify their active driving or resting statuses in electronically-generated driver activity logs. The electronically-generated driver activity logs are typically designed to be periodically reviewed by regulatory authorities and/or fleet operation managers to improve traffic safety and to provide legal compliance. In many cases, the electronically-generated driver activity logs are configured to be tamperproof or "locked" from further adjustments by relevant commercial vehicle driver(s) after a set amount of time (e.g. 12 hours, 24 hours, etc.) has elapsed from the actual time of data recording. The time elapse-triggered "locking" of the electronically-generated driver activity logs is intended to preserve the integrity of the driver activity logs for more robust regulatory compliance associated with mandatory commercial driver resting requirements.

Unfortunately, the "locking" of the driver activity logs may also bring an unintended side effect of preventing honest mistakes or mis-entries from legitimate amendments or corrections in a reasonable timeframe. Furthermore, conventional paper-based or electronically-generated driver activity logs do not provide intuitive methods or guidance to enable a commercial vehicle driver or a vehicle operations manager to audit or correct an inadvertent mistake in the driver activity log entries before the time elapse-triggered "locking" of the driver activity log is engaged.

Therefore, it may be desirable to devise a novel electronic system that proactively identifies potentially-erroneous or incorrect driver activity log entries in real time and provides an intuitive log entry audit and correction interface and guidance to commercial vehicle drivers and commercial vehicle operation managers. Furthermore, it may also be desirable to devise a dynamically-adaptable intelligent voice assistant incorporated into the novel electronic system to provide proactive voice guidance through log entry audit and correction modes and user interfaces for accommodating intuitive methods of log entry corrections and amendments. In addition, it may also be desirable to devise a novel electronic system that determines and alerts chronically-inaccurate and "problematic" commercial vehicle drivers and/or commercial vehicles that cause repeated and inaccurate driver log entries in order to minimize regulatory penalties and optimize commercial vehicle operations.

SUMMARY

Summary and Abstract summarize some aspects of the present invention. Simplifications or omissions may have been made to avoid obscuring the purpose of the Summary or the Abstract. These simplifications or omissions are not intended to limit the scope of the present invention.

In one embodiment of the invention, a commercial fleet-level electronic logging device (ELD) log audit and correction guidance system is disclosed. This system comprises: a vehicle on-board diagnostics (OBD) device connected to an engine control unit (ECU) or a vehicular control chip in a vehicle to record, diagnose, and generate an engine on or off status, vehicle speed data, acceleration and deceleration data, ambient air temperature data, and OBD fault codes as a raw OBD data stream; a vehicle electronic logging device (ELD) connected to the vehicle OBD device, wherein the vehicle ELD is configured to generate a driver-specific ELD log that contains a currently logged-in driver's on-duty, off-duty, and resting activities associated with the vehicle; an ELD and OBD data transceiver connected to the vehicle ELD, wherein the ELD and OBD data transceiver is configured to transmit ELD and OBD data to components of the commercial fleet-level ELD log audit and correction guidance system that are located outside the vehicle; a commercial vehicle-specific ELD log audit and correction guidance application executed in a first portable electronic device for the currently logged-in driver, wherein the commercial vehicle-specific ELD log audit and correction guidance application detects and identifies a potential error in the driver-specific ELD log that contains the currently logged-in driver's on-duty, off-duty, and resting activities associated with the vehicle, and wherein the commercial vehicle-specific ELD log audit and correction guidance application generates a driver auditing-mode interface and an interactive voice guidance to prompt the currently logged-in driver to correct the potential error to avoid a regulatory violation; a commercial fleet-level multiple vehicle ELD log and database management system that analyzes, stores, and categorizes a plurality of driver-specific ELD logs for a plurality of drivers and vehicles in a commercial fleet operation; and a data communication network configured to provide a wireless data information transfer among the vehicle ELD, the ELD and OBD data transceiver, the first portable electronic device, and the commercial fleet-level multiple vehicle ELD log and database management system.

BRIEF DESCRIPTION OF DRAWINGS

FIG. 4 shows a driver status log edit screenshot from an ELD HoS audit and correction guidance system, in accordance with an embodiment of the invention.

DETAILED DESCRIPTION

Figure 1:
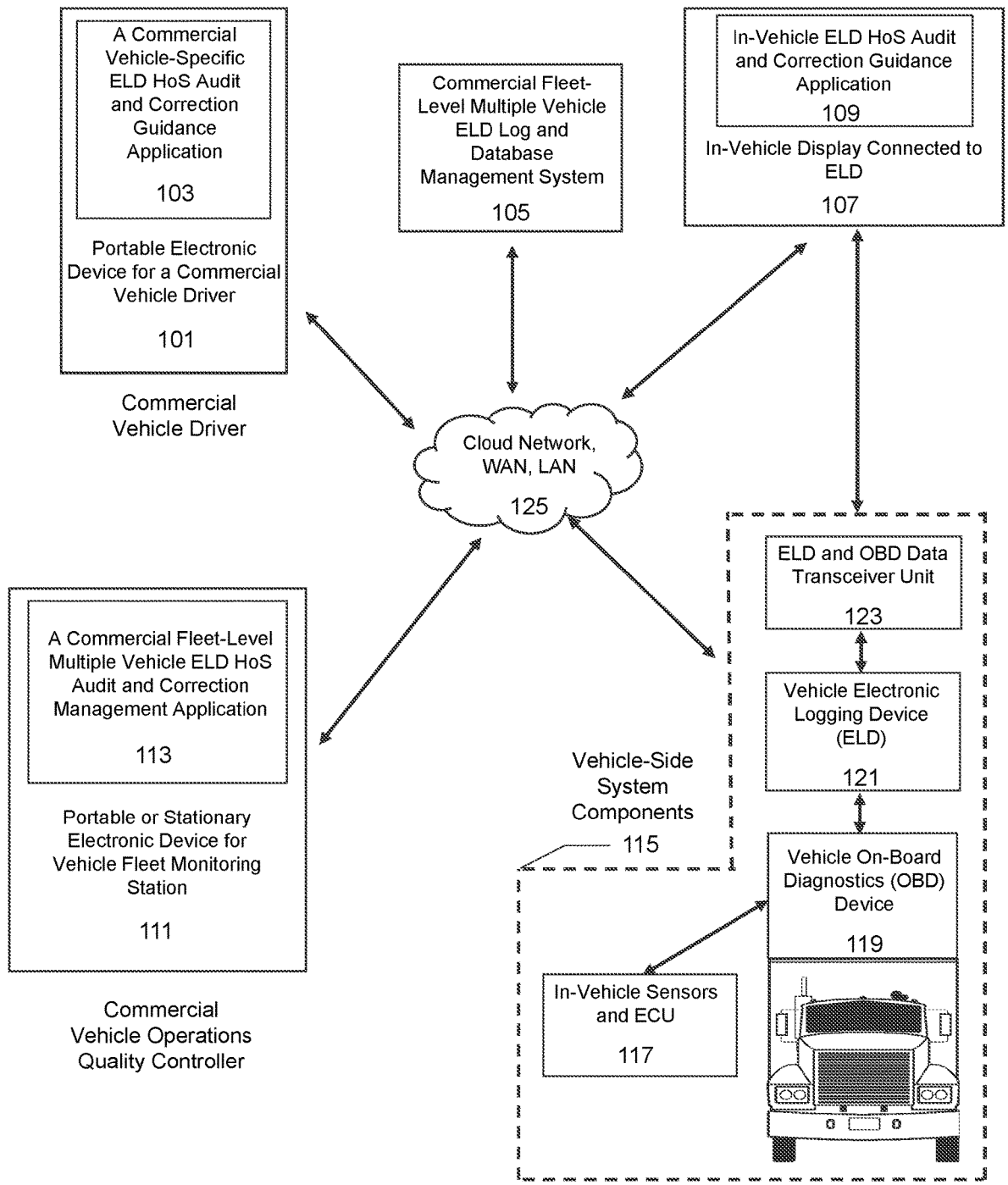
FIG. 1 shows a system block diagram of a commercial fleet-level electronic logging device (ELD) hour-of-service (HoS) audit and correction guidance system, in accordance with an embodiment of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

The detailed description is presented largely in terms of description of shapes, configurations, and/or other symbolic representations that directly or indirectly resemble one or more novel vehicle electronic logging device (ELD) hour-of-service (HoS) audit and correction guidance systems with dynamic voice assistance that provide intuitive and proactive guidance for auditing and amending inadvertent commercial driver log errors. These descriptions and representations are the means used by those experienced or skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment. Furthermore, separate or alternative embodiments are not necessarily mutually exclusive of other embodiments. Moreover, the order of blocks in process flowcharts or diagrams representing one or more embodiments of the invention does not inherently indicate any particular order nor imply any limitations in the invention.

For the purpose of describing the invention, a term referred herein as a "vehicle on-board diagnostics (OBD) device" is defined as an electronic device installed in a vehicle to collect and/or analyze a variety of vehicle-related data. In one example, the vehicle OBD device outputs many data parameters in real-time, such as vehicle diagnostic information (e.g. engine temperature, oil level, OBD codes, and etc.), fuel consumption-related information, vehicle speed information, vehicle acceleration and deceleration information (i.e. measured in g-force or in SI units), ambient air temperature information, engine rotation-per-minute (RPM) information, vehicle location information, and other vehicle-related data. The OBD device is typically connected to an engine control unit (ECU) and a plurality of in-vehicle control or sensor components, such as an accelerometer, a speedometer, a thermostat, a barometer, an emissions control unit, a vehicle electronics control unit, and any other in-vehicle electronics components to check and diagnose the current condition of each connected vehicle component.

Output data parameters from the vehicle OBD device may be utilized to determine a driver's driving activity status and regulatory compliance on the driver's activities as mandated by municipal, state, or federal authorities. The output data parameters from the vehicle OBD can also determine a vehicle malfunction status or a vehicle repair need. For example, if the vehicle has a nonzero speed for a certain amount of time while its engine is running, an associated commercial driver's driving activity status may be determined by a vehicle electronic logging device as being engaged in an "on-duty" status. In another example, if the vehicle has a zero speed for a certain amount of time while its engine is idling, the associated commercial driver's driving activity status may be determined by the vehicle electronic logging device as still being engaged in an "on-duty" status. On the other hand, if the vehicle's engine itself is turned off for a certain amount of time, the associated commercial driver's driving activity status may be determined by the vehicle electronic logging device as being "off-duty," inactive, and/or restful from work. Furthermore, an OBD malfunction code or an abnormal data reading as part of the output data parameters from the vehicle OBD device may indicate or identify the source and the state of the vehicle malfunction.

These data parameters may also be correlated to timestamps generated by an electronic clock associated with the vehicle OBD device. In one embodiment of the invention, the data parameters may be generated by the vehicle OBD device in a region-specific, maker-specific, and/or model-specific format, which requires interpretation and conversion to a compatible output format decodable by a vehicle electronic logging device, a mobile application executed on a portable electronic device, and/or a remotely-located commercial fleet operation vehicle electronic logging database and management system.

Furthermore, for the purpose of describing the invention, a term referred herein as a "vehicle electronic logging device," or an "ELD," is defined as a specialized driver activity log-generating electronic device connected to a vehicle OBD device. This specialized driver activity log-generating electronic device analyzes real-time OBD output data parameters to objectively derive or confirm an ongoing driver activity and/or vehicle repair needs in a commercial vehicle. For example, a vehicle ELD can measure and objectively confirm a commercial vehicle driver's on-duty driving by tracking a nonzero vehicle speed data parameter and an engine "on" status signal from the vehicle OBD device, until the commercial vehicle driver stops and turns off the engine.

Similarly, the vehicle ELD can objectively measure and confirm the commercial vehicle driver's off-duty resting period with a system clock and a duration of the engine "off" status signal. Machine and sensor-based determination of driving activity statuses from ELD and OBD devices can be utilized even further to create a commercial vehicle hour-of-service audit and correction guidance system that pre-emptively alerts and guides a related commercial vehicle driver and/or a commercial fleet manager to encourage and accommodate a proactive correction of commercial drivers' electronic log entries to avoid unnecessary regulatory violations and to preserve log accuracy and regulatory compliance for commercial vehicle driving activities.

Moreover, the vehicle ELD may be configured to monitor, track, and record vehicle malfunction codes from the OBD device and incorporate them automatically in a driver vehicle inspection report, which may be initiated, updated, or rectified by a commercial vehicle driver and/or a designated auto mechanic In addition, regulatory compliance related to a required duration of the commercial vehicle driver's rest can also be tracked and alerted to appropriate authorities (e.g. local, national, and/or federal traffic safety enforcement agencies, fleet managers, etc.) by the vehicle ELD and/or an ELD log audit and correction guidance system connected to an in-vehicle data transceiver unit, which further communicates with a remotely-located monitoring station.

In a preferred embodiment of the invention, the vehicle ELD and the ELD log audit and correction guidance system are also configured to accept the commercial vehicle driver's manual data entries and corrections, which are then automatically compared against and/or merged with machine-determined driver's activity log information derived from the vehicle OBD device to complete synthesis of a new or amended electronically-generated driver activity log that incorporates both objective (i.e. machine-determined) and subjective (i.e. driver-entered) information for enhanced details and accuracy.

Furthermore, for the purpose of describing the invention, a term referred herein as "hour of service," or "HoS" is defined as a real-time, hourly, and/or minutely-managed and monitored commercial driving activity parameters and logs for commercial vehicle regulatory compliance required by state, municipal, and/or federal government agencies. For example, an electronic logging device (ELD) hour-of-service (HoS) audit and correction guidance system is a vehicle-installed ELD that additionally incorporates pre-emptive regulatory violation (i.e. "pre-violation") alert and log amendment capabilities to enable early-stage correction (i.e. within minutes or hours of a potential pre-violation log element creation) of potentially erroneous commercial driving activity parameters that may have been a result of a driver's carelessness or machine-generated entry errors.

Moreover, for the purpose of describing the invention, a term referred herein as a "portable electronic device" is defined as a smart phone, a tablet computer, a notebook computer, a special-purpose proprietary ELD data controller device, or another transportable electronic device that can execute a vehicle ELD HoS audit and correction guidance and/or management application for a commercial vehicle driver or a vehicle fleet operator.

Furthermore, for the purpose of describing the invention, a term referred herein as a "remote monitoring station unit" is defined as a vehicle fleet monitoring location for one or more commercial vehicles in operation. Examples of remote monitoring station units include, but are not limited to, a commercial vehicle operation control center, a regulatory traffic safety enforcement agency, a vehicle monitoring service center, and a fleet vehicle employer's information technology (IT) control center. Typically, the remote monitoring station unit is configured to execute and operate a commercial fleet-level multiple vehicle ELD log and database management system as well as a commercial fleet-level multiple vehicle ELD HoS audit and correction management application in a computer server, a portable electronic device, or another computerized device.

In addition, for the purpose of describing the invention, a term referred herein as "computer server" is defined as a physical computer system, another hardware device, a software module executed in an electronic device, or a combination thereof. Furthermore, in one embodiment of the invention, a computer server is connected to one or more data networks, such as a local area network (LAN), a wide area network (WAN), a cellular network, and the Internet. Moreover, a computer server can be utilized by a vehicle monitoring personnel for gathering and analyzing electronically-generated commercial vehicle driver logs that are stored, updated, and modified by a commercial fleet-level multiple vehicle ELD log and database management system.

One aspect of an embodiment of the present invention is providing a novel electronic system for commercial driver electronic logging rule compliance and ELD log entry correction guidance to reduce or prevent regulatory violations at an early stage of data abnormality discoveries.

Another aspect of an embodiment of the present invention is providing a novel electronic system, such as an ELD hour-of-service audit and correction guidance system, that proactively identifies potentially-erroneous or incorrect driver activity log entries in real time and creates an intuitive log entry audit and correction interface and guidance to commercial vehicle drivers and commercial vehicle operation managers.

Furthermore, another aspect of an embodiment of the present invention is providing a dynamically-adaptable intelligent voice assistant incorporated into the novel electronic system to enable proactive voice guidance through log entry audit and correction modes and user interfaces for accommodating intuitive methods of log entry corrections and amendments.

Yet another aspect of an embodiment of the present invention is providing a novel electronic system that determines and monitors chronically-inaccurate and "problematic" commercial vehicle drivers and/or commercial vehicles that cause repeated and inaccurate driver log entries to minimize regulatory penalties and optimize commercial vehicle operations.

FIG. 1 shows a system block diagram (100) of a commercial fleet-level electronic logging device (ELD) hour-of-service (HoS) audit and correction guidance system, in accordance with an embodiment of the invention. In a preferred embodiment of the invention, the commercial fleet-level ELD HoS audit and correction guidance system comprises an automotive vehicle, a vehicle on-board diagnostics (OBD) device (119) installed in the automotive vehicle, in-vehicle sensors and an engine control unit (117) connected to the OBD device (119), a vehicle electronic logging device (ELD) (121), an ELD and OBD data transceiver unit (123), a portable electronic device (101) for a commercial vehicle driver, a commercial vehicle-specific ELD HoS audit and correction guidance application (103) executed on the portable electronic device (101) for the commercial vehicle driver, a portable or stationary electronic device (111) for a vehicle monitoring station operated by a commercial vehicle operations quality controller, a commercial fleet-level multiple vehicle ELD HoS audit and correction management application (113) executed on the portable or stationary electronic device (111), a commercial fleet-level multiple vehicle ELD log and database management system (105) executed on a cloud network-connected computer server, and a wired and/or wireless data network (125). Furthermore, the commercial fleet-level ELD HoS audit and correction guidance system may optionally also include an in-vehicle display (107) connected to the vehicle ELD (121) and an in-vehicle ELD HoS audit and correction guidance application (109) executed by the vehicle ELD (121) or by another in-vehicle electronic device per automotive vehicle.

Moreover, as shown in the system block diagram (100) in FIG. 1, the in-vehicle sensors and the ECU (117), the vehicle OBD device (119), the vehicle ELD (121), and the ELD and OBD data transceiver unit (123) are typically incorporated physically in the automotive vehicle as vehicle-side system components (115) of the commercial fleet-level ELD HoS audit and correction guidance system. In the preferred embodiment of the invention, the automotive vehicle is a truck, a van, a bus, or another commercial operation-registered vehicle, which is typically utilized for commercial transport of freight and/or passengers that involve state, federal, municipal, and/or corporate regulations to ensure appropriate levels of commercial drivers' mandatory resting periods between vehicle operations and vehicle maintenance for public safety. The electronic commercial driving activity logs and maintenance recordkeeping requirements are typically based on mileage, calendar days, and/or hours of service for each commercial driver. In another embodiment of the invention, the automotive vehicle may be a private vehicle (i.e. not registered as a commercially-operated vehicle), which is shared among a plurality of drivers via car ride-sharing services or passenger transport services.

Furthermore, the vehicle OBD device (119) is a specialized electronic device installed in the automotive vehicle to collect and/or analyze a variety of vehicle-related data, including engine on/off status, engine temperature, OBD fault codes, speed, acceleration, ambient air temperature, ambient air pressure, engine rotation-per-minute (RPM), vehicle location, and other vehicle-related output parameters generated by an engine control unit (ECU), a transmission control module (TCM), an accelerometer, a barometer, a fuel pressure sensor, other in-vehicle sensors (e.g. 117), or other electronic components connected to the vehicle OBD device (119). In the preferred embodiment of the invention as shown in FIG. 1, output data parameters from the vehicle OBD device (119) are utilized to formulate at least part of a commercial vehicle electronic driver log that contains a commercial vehicle driver's on-duty/off-duty status, the commercial vehicle driver's resting activity information, vehicle engine on/off time, driving distance information for a particular on-duty timeframe, and other driving activity or status information generated from machines and/or entered by the commercial vehicle driver. The commercial vehicle electronic driver log or a driver vehicle inspection report (DVIR) may additionally indicate that the automotive vehicle requires repairs or maintenance work based on OBD fault codes or other data parameters generated from the vehicle OBD device (119). The vehicle OBD device (119) may also be utilized to determine a driver's driving activity status via the vehicle electronic logging device (ELD) (121), which requires each time-shared commercial vehicle driver of the same automotive vehicle to log in or log off electronically to indicate time periods of specific driver activity.

Continuing with the embodiment of the invention as shown in FIG. 1, any OBD fault codes or data parameters from the vehicle OBD device (119) that are related to engine on/off statuses and driving activities become part of a particular driver's commercial vehicle electronic driver log automatically even without human intervention, and are further analyzed and stored by the vehicle ELD (121) and the commercial fleet-level multiple vehicle ELD log and database management system (105). Furthermore, a commercial vehicle driver is also typically required to provide at least some manual information entries into the vehicle ELD (121) via the in-vehicle display (107), the portable electronic device (101), or another data entry-capable electronic interfaces before and after each commercial driving activity to confirm a driver identity and update a current on-duty or off-duty status with the vehicle ELD (121). Commercial vehicle electronic driver logs, OBD codes, and any in-vehicle sensor-originating data parameters that are specific to the automotive vehicle can be remotely transmitted to and further processed by the commercial fleet-level multiple vehicle ELD log and database management system (105) via the ELD and OBD data transceiver unit (123) and the wired and/or wireless data network (125).

In the preferred embodiment of the invention, the commercial fleet-level multiple vehicle ELD log and database management system (105), the in-vehicle ELD HoS audit and correction guidance application (109), and/or the commercial vehicle-specific ELD HoS audit and correction guidance application (103) may determine that a recent commercial vehicle electronic driver log generated in the last hour, in the last eight hours, in the last twenty-four hours, or in another recent recording timeframe may contain unusual or anomalous driver log parameters that are likely to result in commercial vehicle activity regulatory violations, if left uncorrected within a certain time limit. For example, a commercial vehicle driver may simply forget to log out of a currently-active commercial vehicle electronic driver log managed by the vehicle ELD (121) after a workday and not return to the vehicle until the next morning, which in turn keeps the "on-duty" status active erroneously throughout the night. Because the currently-active commercial vehicle electronic driver log has not accurately recorded an end of the commercial vehicle driver's "on-duty" status in this particular instance, a federal, state, or municipal regulatory violation may be triggered after a few days for not taking sufficient rest periods between on-duty driving activities, unless the commercial vehicle driver or an operations manager proactively amends the erroneous information in the recent commercial vehicle electronic driver log.

As shown in the system block diagram (100) in FIG. 1, the commercial fleet-level multiple vehicle ELD log and database management system (105), the in-vehicle ELD HoS audit and correction guidance application (109), and/or the commercial vehicle-specific ELD HoS audit and correction guidance application (103) are configured to detect and identify such unusual or anomalous driver log parameters that are likely to result in commercial vehicle activity regulatory violations, if left uncorrected within a certain time limit Once such unusual or anomalous driver log parameters are detected and identified, the in-vehicle ELD HoS audit and correction guidance application (109) and/or the commercial vehicle-specific ELD HoS audit and correction guidance application (103) are configured to provide driver auditing and log entry edit modes in a graphical user interface generated by the in-vehicle display (107) connected to the vehicle ELD (121) or by the portable electronic device (101) for the commercial vehicle driver. The in-vehicle ELD HoS audit and correction guidance application (109) and/or the commercial vehicle-specific ELD HoS audit and correction guidance application (103) are also configured to provide intelligent voice guidance through log entry auditing and editing procedures in multiple languages.

Furthermore, the in-vehicle ELD HoS audit and correction guidance application (109) and/or the commercial vehicle-specific ELD HoS audit and correction guidance application (103) are also capable of generating urgent regulatory violation alerts and/or upcoming deadlines for a regulatory violation trigger point as a pre-violation alert. Each violation or pre-violation alert may be generated in form of an alert siren, a voice message, a textual message, and/or another aural or visual indicator. In addition, the commercial fleet-level multiple vehicle ELD HoS audit and correction management application (113) and the commercial fleet-level multiple vehicle ELD log and database management system (105) are also configured to monitor and determine chronically-inaccurate commercial vehicle drivers and/or commercial vehicles that cause repeated and inaccurate driver log entries. For example, if a particular commercial vehicle driver makes repeated mistakes of not logging into the vehicle ELD (121) before an on-duty driving, or not logging out of the vehicle ELD (121) after the on-duty driving is completed, the commercial fleet-level multiple vehicle ELD HoS audit and correction management application (113) and the commercial fleet-level multiple vehicle ELD log and database management system (105) may identify the particular commercial vehicle driver as a "chronically-inaccurate repeat offender," and alert the commercial vehicle operations quality controller to prevent or reduce similar mistakes by the particular commercial vehicle driver in the future. Such proactive and intelligent regulatory violation quality control protocols enhance the utility of the commercial fleet-level ELD HoS audit and correction guidance system to minimize costly regulatory penalties, improve regulatory compliance among employees, and optimize commercial vehicle operations.

In the preferred embodiment of the invention, the in-vehicle ELD HoS audit and correction guidance application (109), the commercial vehicle-specific ELD HoS audit and correction guidance application (103), and/or the commercial fleet-level multiple vehicle ELD HoS audit and correction management application (113) are configured to generate interactive and dynamic voice guidance to assist a commercial vehicle driver or a commercial vehicle operations quality controller to edit or amend inadvertent errors and to confirm desired changes to a commercial vehicle electronic driver log before a legally-mandated log correction period expires. Moreover, the interactive and dynamic voice guidance for ELD HoS audit and correction is typically not merely a pre-recorded static voice narration, but rather an intelligent artificial intelligence-based voice guidance that corresponds to real-time changes to the commercial vehicle electronic driver log, as streams of incoming OBD, ECU, and/or ELD data parameters continue to update the commercial vehicle electronic driver log, if the log is currently still in an active-synthesis mode. Preferably, the interactive and dynamic voice guidance for ELD HoS audit and correction is offered in multiple languages (i.e. English, Spanish, Chinese, etc.) to enable a preferred native language selection that the commercial vehicle driver or the commercial vehicle operations quality controller is most familiar with.

In the preferred embodiment of the invention, the interactive voice guidance provided by a plurality of ELD HoS audit and correction guidance or management applications (e.g. 103, 109, 113) empowers drivers and operations controllers to immerse intelligent and dynamic data-incorporating voice guidance and related voice command or touch-screen menu interactions in their native languages, such as English, Spanish, Chinese, and Hindi. The multi-language voice guidance capabilities of the ELD HoS audit and correction guidance system further enhances inadvertent log error correction rates and regulatory compliance rates for commercial vehicle drivers and fleet operations quality controllers, regardless of their native languages and cultural backgrounds.

Furthermore, in one embodiment of the invention, the vehicle ELD (121) is capable of tracking each driver's activity status. For example, if the automotive vehicle has a nonzero speed for a particular amount of time while its engine is running, the driver's driving activity status is analyzed, determined, and recorded by the vehicle ELD (121) as being engaged in an "on-duty" status. The vehicle ELD (121) is capable of objectively determining and confirming the driver's "on-duty" or active driving status by analyzing the incoming machine-generated vehicle-related output parameters from the vehicle OBD device (119) in real time. Furthermore, in some embodiments, "on-duty" or "off-duty" statuses may also be determined at least in part by a driver's log-in and log-off actions via a user interface associated with the vehicle ELD (121), as each driver initiates or ends a commercial driving activity for a particular workday. Each driver may access and modify log-in or log-off events via the in-vehicle display connected to ELD (107), the portable electronic device for the commercial vehicle driver (101), or another electronic device configured to execute a user interface application for the vehicle ELD (121).

In various embodiments of the invention, the record generated and stored by the vehicle ELD (121) becomes an electronic driver activity log (e.g. active, inactive, resting, sleeping, etc.) correlated to a system time clock, and in some instances, become part of a driver's vehicle inspection report (DVIR). Moreover, in the preferred embodiment, the vehicle ELD (121) also enables the driver to manually enter or describe his or her driving status (e.g. active, inactive, resting, sleeping, etc.) correlated to the system time clock. Preferably, the vehicle ELD (121) accepts the driver's manual data entry to compare against and/or merge with machine-determined driver's activity log information derived from the vehicle OBD device (119), and completes synthesis of the electronically-generated driver activity log that incorporates both objective (i.e. machine-determined) and subjective (i.e. driver-entered) information for enhanced details and accuracy.

In another example, if the automotive vehicle has a zero speed for a certain amount of time while its engine is idling, the associated commercial driver's driving activity status may be determined by the vehicle ELD (121) as still being engaged in an "on-duty" status, which counts toward the driver's on-the-job active hours, and not toward the mandatory rest period. On the other hand, if the vehicle's engine itself is turned off for a certain amount of time, the associated driver's driving activity status may be determined by the vehicle ELD (121) as being "off-duty," inactive, and/or restful from work, and recorded by the vehicle ELD (121) as part of the mandatory rest period. In the preferred embodiment of the invention, the vehicle ELD (121) is configured to associate and/or record timestamps generated by a system clock with durations and changes in each driving activity status, which also become part of the electronically-generated driving activity logs for a plurality of drivers that time-share the automotive vehicle.

Furthermore, the vehicle ELD (121), as shown in FIG. 1, is a specialized driver activity log-generating electronic device connected to the vehicle OBD device (119). In the preferred embodiment, the vehicle ELD (121) is a discrete piece of hardware device operatively connected to the vehicle OBD device (119) via a physical cable or a wireless communication protocol. In another embodiment, the vehicle ELD (121) is an integrated device that incorporates the vehicle OBD device (119) within its physical casing.

In the preferred embodiment of the invention, the vehicle ELD (121) is configured to analyze real-time OBD output data parameters to objectively derive or confirm an ongoing driver activity. For example, the vehicle ELD (121) can measure and objectively confirm a commercial vehicle driver's on-duty driving by tracking a nonzero vehicle speed data parameter and an engine "on" status signal from the vehicle OBD device, until the commercial vehicle driver stops and turns off the engine.

Similarly, the vehicle ELD (121) can objectively measure and confirm the commercial vehicle driver's off-duty resting period with a system clock and a duration of the engine "off" status signal. In some cases, the vehicle ELD (121), either singularly or in combination with the commercial fleet-level multiple vehicle ELD log and database management system (105) and the portable or stationary electronic device for vehicle fleet monitoring station (111), is also configured to analyze the real-time OBD output data parameters and manual entries by a driver to detect anomalous or unusual data elements that are likely to be inadvertent erroneous entries form the vehicle OBD device (119) or the driver. Once likely-inadvertent and likely-erroneous entries are identified by the system, at least one of the in-vehicle ELD HoS audit and correction guidance application (109), the commercial vehicle-specific ELD HoS audit and correction guidance application (103), and/or the commercial fleet-level multiple vehicle ELD HoS audit and correction management application (113) is configured to generate a pre-violation alert or a siren as part of a machine-generated dynamic voice guidance. The machine-generated dynamic voice guidance is further synchronized with a driver auditing-mode graphical user interface and other log entry amendment-enabling menus to prevent a regulatory violation before an actual violation related to commercial vehicle drivers' resting requirements, speed limit requirements, substitute driver requirements, vehicle maintenance reporting requirements, and/or other regulatory issues is triggered.

Importantly, "pre-violation" alerts generated by various embodiments of the present invention can prevent unnecessary fines or penalties arising from commercial vehicle drivers' accidental or intentional violations of federal, state, and/or municipal regulatory requirements. The machine-generated dynamic voice guidance that incorporates the "pre-violation" alert may utilize real-time data output parameters from the in-vehicle sensors and ECU (117), the vehicle OBD device (119), the vehicle ELD (121), or cloud-based historical vehicle performance or driver behavioral data accessed from the commercial fleet-level multiple vehicle ELD log and database management system (105). Furthermore, regulatory compliance related to a required duration of the commercial vehicle driver's rest can also be tracked and alerted to appropriate authorities (e.g. local, national, and/or federal traffic safety enforcement agencies, fleet managers, etc.) by the vehicle ELD (121) connected to the in-vehicle ELD and OBD data transceiver unit (123). The in-vehicle ELD and OBD data transceiver unit (123) is configured to communicate wirelessly with portable electronic devices and/or computer servers via a cellular network, a satellite network, a wireless LAN, another wireless data network, or a combination thereof, wherein the portable electronic devices and/or the computer servers are operated by a remote monitoring station overseeing the commercial fleet-level multiple vehicle ELD log and database management system (105) and a plurality of drivers, operations quality controllers, and regulatory authorities, as shown in FIG. 1.

Continuing with the preferred embodiment of the invention as shown in FIG. 1, each of the portable electronic devices (i.e. 101, 111) for commercial vehicle drivers and operations quality controllers is a smart phone, a tablet computer, a laptop computer, a desktop computer, a specialized proprietary commercial fleet management electronic device, or another portable electronic device, which is configured to execute one or more ELD HoS audit and correction guidance applications (i.e. 103, 109, 113) in a CPU/APU (i.e. a central processing unit or an application processing unit) and a memory unit of each portable electronic device. The portable electronic devices utilized by drivers and vehicle operations quality controllers are operatively connected to each other and other elements (e.g. 105, 115, etc.) of the ELD HoS audit and correction guidance system via the wired and/or wireless data network (125), which may include a cellular network, a satellite network, a wireless LAN, a cloud-computing resource network, or a combination thereof.

As shown by the embodiment of the invention illustrated in FIG. 1, the in-vehicle ELD HoS audit and correction guidance application (109), the commercial vehicle-specific ELD HoS audit and correction guidance application (103), the commercial fleet-level multiple vehicle ELD HoS audit and correction management application (113), and the vehicle-side system components (115) can communicate each other directly on a peer-to-peer basis in the wired and/or wireless data network (125). Alternatively, electronic communications and data transfer among these elements can be mediated, managed, or controlled by the commercial fleet-level multiple vehicle ELD log and database management system (105), which is typically executed and hosted by one or more computer servers in a remote monitoring station. For example, the commercial fleet-level multiple vehicle ELD log and database management system (105) may have data correction or overriding privileges to amend erroneous ELD log and DVIR entries before or after the data lockout period for recent ELD log entries and DVIR entries, depending on federal, state, municipal, and/or corporate regulatory compliance rules for the data lockout. In another example, the commercial fleet-level multiple vehicle ELD log and database management system (105) may intervene, overtake, or correct communication disruptions or no responses among a plurality of ELD HoS audit and correction guidance or management applications (103, 109, 113) and vehicle-side system components (115), if a particular commercial vehicle driver or another related participant fails to respond to the system's repeated alerts for ELD log pre-violations or data abnormalities that require log entry amendments or corrections.

It should be noted that federal, state, municipal, and/or corporate regulations may require each commercial vehicle driver to finalize his or her on-duty ELD log and DVIR entries within a defined time limit (e.g. within 24 hours of on-duty vehicle operation, etc.) before freezing and locking the contents of the ELD and DVIR logs from additional modifications to preserve the data integrity from unauthorized or undesirable retroactive alterations. Therefore, the ELD HoS audit and correction guidance system improves timely corrections or amendments to inadvertent ELD log entry errors before triggering regulatory violations by proactively identifying, encouraging, and accommodating log entry corrections before the data log freeze period is reached.

Figure 2:
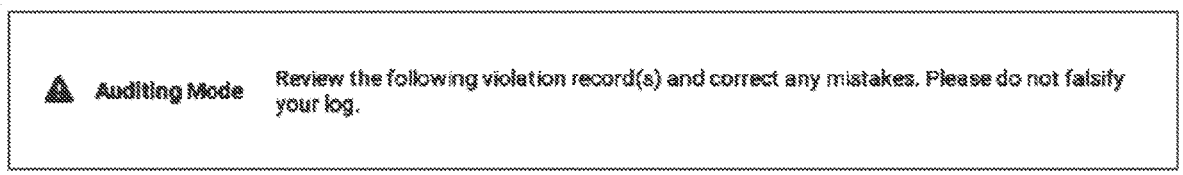
FIG. 2 shows a driver auditing-mode screenshot from an ELD HoS audit and correction guidance system, in accordance with an embodiment of the invention.

FIG. 2 shows a driver auditing-mode screenshot (200) from an ELD HoS audit and correction guidance system, in accordance with an embodiment of the invention. In a preferred embodiment of the invention, an in-vehicle ELD HoS audit and correction guidance application (e.g. 109 in FIG. 1), a commercial vehicle-specific ELD HoS audit and correction guidance application (e.g. 103 in FIG. 1), or a commercial fleet-level multiple vehicle ELD HoS audit and correction management application (e.g. 113 in FIG. 1) is configured to generate a driver auditing mode user interface on an in-vehicle display connected to ELD (e.g. 107) or on a portable electronic device utilized by a commercial vehicle driver (e.g. 101).

In the preferred embodiment of the invention, the ELD HoS audit and correction guidance system is configured to determine that a currently-active commercial vehicle electronic driver log contains a pre-violation item or an anomalous log element that urgently requires the commercial vehicle driver's immediate attention for timely amendment to avoid triggering a regulatory violation. Preferably, the ELD HoS audit and correction guidance system is able to determine and identify the pre-violation item or the anomalous log element at least several hours before a mandatory data content freeze period is reached for the currently-active commercial vehicle electronic driver log to give sufficient time to the commercial vehicle driver to correct or amend the pre-violation item or the anomalous log element, if it is a correctable and inadvertent error.

In the example shown as the driver auditing-mode screenshot (200) in FIG. 2, the driver auditing mode user interface displays a log timeline with a highlighted or a blacked-out section (e.g. midnight (M)~11:07 AM) that the ELD HoS audit and correction guidance system identified as a potentially-inadvertent error caused by the commercial vehicle driver. The driver auditing mode user interface also produces a chronologically-organized list of ELD log activities, including the likely-erroneous "on-duty" entry (e.g. "ON" (midnight (M)~11:07 AM)), active driving entries (e.g. "DRV" (11:07 AM~11:09 AM), (3:26 PM~3:44 PM)), and off-duty entries (e.g. "OFF" (3:44 PM~ongoing)). In this example, a break rule violation was triggered at 11:07 AM, while a shift rule violation was triggered at 3:26 PM. The shift rule violation in this case may be a second-order effect of the break rule violation that was accidentally triggered due to the incorrect log entry of an "on-duty" status between midnight (M) and 11:07 AM.

Importantly, in this example, the ELD HoS audit and correction guidance system can make a preliminary determination of anomalous data in this example by intelligently recognizing that an "on-duty" status duration of 11 hours and 7 minutes, during which the vehicle did not engage in any active driving, is indicative of a mistakenly-forgotten log-out confirmation by the commercial vehicle driver at midnight (M). If the commercial vehicle driver simply forgot to log out of the vehicle ELD at the end of his or her work period, the "on-duty" status may accidentally remain turned on while the commercial vehicle electronic driver log is still in a recording mode. If left uncorrected, the "on-duty" status that remained active for more than 11 hours (i.e. without any driving activity between midnight (M)~11:07 am) triggers a mandatory rest period violation after a certain number of "on-duty" log hours elapses.

Figure 3:
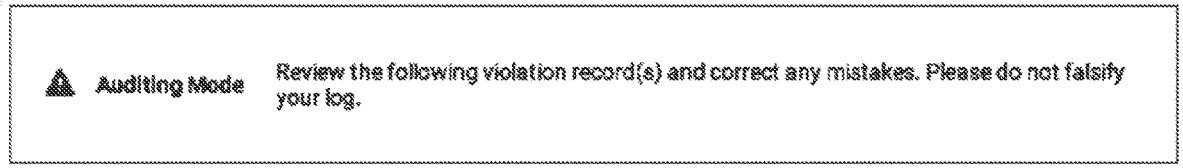
FIG. 3 shows another screenshot of a driver auditing-mode from an ELD HoS audit and correction guidance system, in accordance with an embodiment of the invention.
Figure 3:
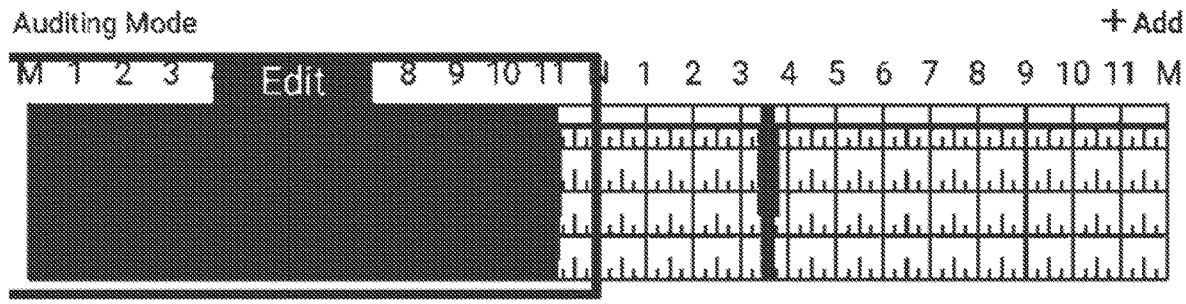

FIG. 3 shows a subsequent screenshot (300) of the driver auditing mode from the ELD HoS audit and correction guidance system in a sequence after the driver auditing-mode screenshot (200), in accordance with an embodiment of the invention. In a preferred embodiment of the invention, the driver auditing mode user interface presented on the in-vehicle display (e.g. 107) or on the portable electronic device (e.g. 101) is generated by the in-vehicle ELD HoS audit and correction guidance application (e.g. 109 in FIG. 1), the commercial vehicle-specific ELD HoS audit and correction guidance application (e.g. 103 in FIG. 1), or the commercial fleet-level multiple vehicle ELD HoS audit and correction management application (e.g. 113 in FIG. 1).

As shown in the current screenshot (300) of the driver auditing mode from the ELD HoS audit and correction guidance system in FIG. 3, the auditing mode invokes an edit feature that draws a frame around the highlighted or the blacked-out section (e.g. midnight (M)~11:07 AM), which the ELD HoS audit and correction guidance system identified as the potentially-inadvertent error caused by the commercial vehicle driver in FIG. 2. The commercial vehicle driver or another user is then able to modify or amend erroneous information, if the log entries are corrigible mistakes. In one embodiment of the invention, human entry errors, such as forgetting to log in or log out of the vehicle ELD interface, may be considered corrigible mistakes that can utilize the driver auditing mode for log entry amendments, while machine entry errors, such as incorporating ECU parameters that indicate whether the vehicle engine was on or off, or whether the vehicle was driving forward or not, may be considered objective and thus "incorrigible" log entries.

FIG. 4 shows a driver status log edit screenshot (400) from an ELD HoS audit and correction guidance system, in accordance with an embodiment of the invention. The driver status log edit screenshot (400) is a subsequent sequence following the driver auditing mode from the ELD HoS audit and correction guidance system, wherein the commercial vehicle driver or another user is able to modify the erroneous "on-duty" log entry to an "off-duty" log entry or to a "sleeper berth" rest log entry for a time section that was previously identified as potentially erroneous (e.g. midnight (M)~11:07 AM) by the ELD HoS audit and correction guidance system.

As shown in FIG. 4, the commercial vehicle driver or another authorized user is able to amend a potentially-erroneous log entry after a system alert or a siren generated by the ELD HoS audit and correction guidance system. The system alert may be textual, graphical, aural, machine-generated phone calls, or any combination thereof, which prompts the commercial vehicle driver or another relevant user to interact with the driver auditing mode user interface to correct or amend urgent and corrigible mistakes in the ELD log.

In a preferred embodiment of the invention, the driver auditing mode user interface and the edit status log interface are presented on the in-vehicle display (e.g. 107) or on the portable electronic device (e.g. 101), and are generated by the in-vehicle ELD HoS audit and correction guidance application (e.g. 109 in FIG. 1), the commercial vehicle-specific ELD HoS audit and correction guidance application (e.g. 103 in FIG. 1), or the commercial fleet-level multiple vehicle ELD HoS audit and correction management application (e.g. 113 in FIG. 1), as previously described in conjunction with FIGS. 1~3.

Figure 5:
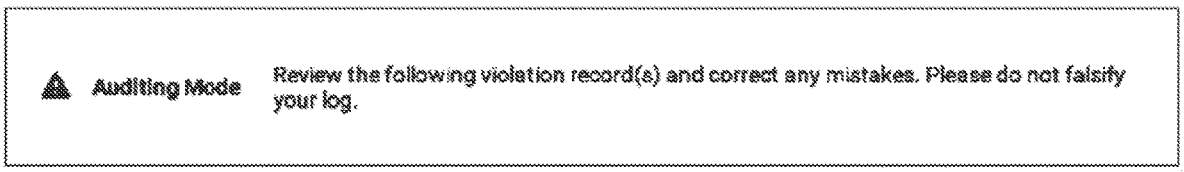
FIG. 5 shows a driver auditing-mode screenshot after driver-initiated corrections from an ELD HoS audit and correction guidance system, in accordance with an embodiment of the invention.

FIG. 5 shows a driver auditing-mode screenshot (500) after driver-initiated corrections from an ELD HoS audit and correction guidance system, in accordance with an embodiment of the invention. The driver auditing-mode screenshot (500) as shown in FIG. 5 is a subsequent sequence following the completion of manual log entry amendments or corrections by the commercial vehicle driver or another responsible entity, such as a commercial vehicle operations quality controller or a fleet vehicle manager.

As shown by the driver auditing-mode screenshot (500), the ELD HoS audit and correction guidance system has completed assisting the commercial vehicle driver or another responsible party to correct the inadvertent log entry error, and the break violation and the shift violation warning indicators have both been removed from the driver auditing-mode interface. The erroneous "on-duty" status between midnight (M) and 11:07 AM is now corrected to an "off-duty" status, as shown in FIG. 5. This correction prevents triggering of accidental and unintended regulatory violations for not taking mandatory rest between on-duty statuses for the commercial vehicle driver.

In a preferred embodiment of the invention, the driver auditing mode user interface and the edit status log interface are presented on the in-vehicle display (e.g. 107) or on the portable electronic device (e.g. 101), and are generated by the in-vehicle ELD HoS audit and correction guidance application (e.g. 109 in FIG. 1), the commercial vehicle-specific ELD HoS audit and correction guidance application (e.g. 103 in FIG. 1), or the commercial fleet-level multiple vehicle ELD HoS audit and correction management application (e.g. 113 in FIG. 1), as previously described in conjunction with FIGS. 1~4.

Figure 6:
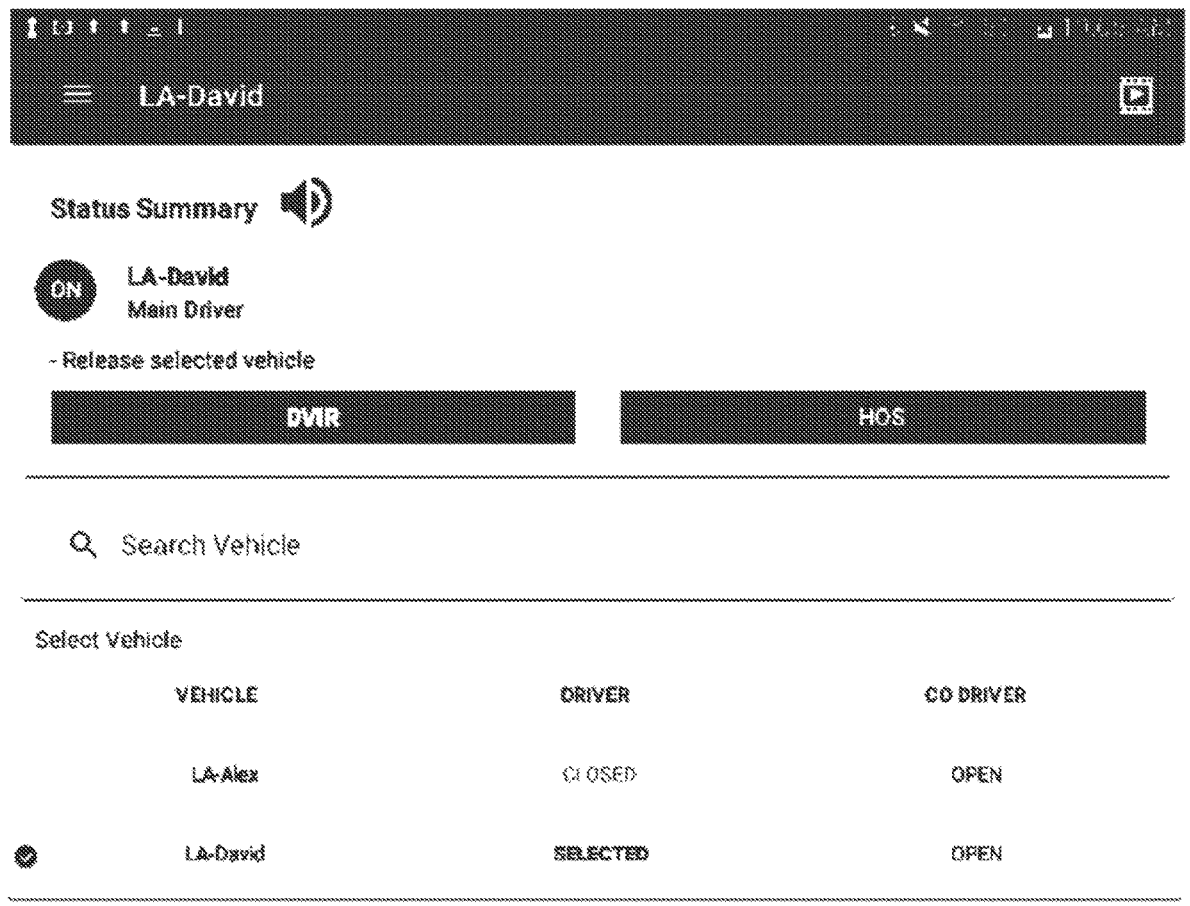
FIG. 6 shows a vehicle and driver selection interface screenshot from an ELD HoS audit and correction guidance system, in accordance with an embodiment of the invention.

FIG. 6 shows a vehicle and driver selection interface screenshot (600) from an ELD HoS audit and correction guidance system, in accordance with an embodiment of the invention. The vehicle and driver selection interface, as exemplified in FIG. 6, enables a commercial vehicle operations quality controller or a commercial vehicle driver to assign or release a particular commercial vehicle for ELD log or DVIR generation for a main driver, or a co-driver who may be time-sharing work hours with the main driver in the particular commercial vehicle. Furthermore, the vehicle and driver selection interface also enables the commercial vehicle operations quality controller or the commercial vehicle driver to open or close ELD logs or driver vehicle inspection reports (DVIRs) for timely corrections or amendments before the log data contents are legally required to be frozen from any additional changes for regulatory compliance imposed on commercial vehicle fleet operations.

Figure 7:
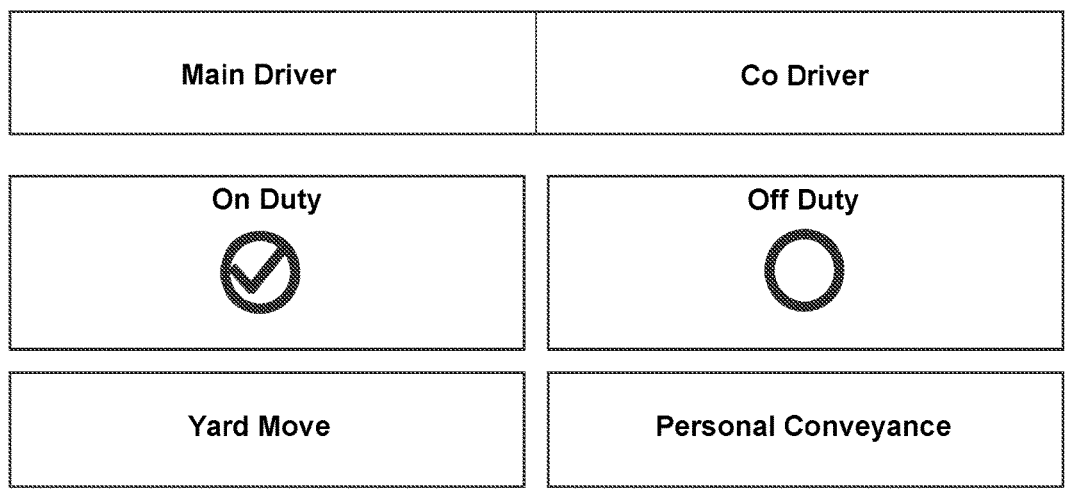
FIG. 7 shows a commercial driver electronic logging current status menu screenshot from an ELD HoS audit and correction guidance system, in accordance with an embodiment of the invention.
Figure 7:
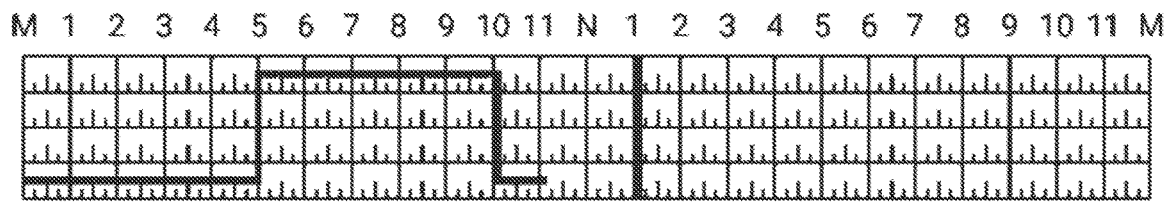

FIG. 7 shows a commercial driver electronic logging current status menu screenshot (700) from an ELD HoS audit and correction guidance system, in accordance with an embodiment of the invention. In a preferred embodiment of the invention, an in-vehicle ELD HoS audit and correction guidance application (e.g. 109 in FIG. 1), a commercial vehicle-specific ELD HoS audit and correction guidance application (e.g. 103 in FIG. 1), or a commercial fleet-level multiple vehicle ELD HoS audit and correction management application (e.g. 113 in FIG. 1) is configured to generate a commercial driver electronic logging current status menu on an in-vehicle display connected to ELD (e.g. 107) or on a portable electronic device utilized by a commercial vehicle driver (e.g. 101).

In the preferred embodiment of the invention, the ELD HoS audit and correction guidance system is capable of determining an upcoming regulatory violation deadline for the commercial vehicle driver, who is currently operating the vehicle while the driver-specific ELD log is being generated in real time. As shown by the commercial driver electronic logging current status menu screenshot (700), the main driver is currently on duty and has an upcoming rest or shift violation in approximately two hours (i.e. 1 PM) from present time (i.e. 11 AM). Preferably, the upcoming rest or shift violation is graphically indicated as a colored or highlighted vertical bar at the time of a violation trigger point (i.e. 1 PM) in the near-future timeline, which is located on the right side of the present time reference (i.e. 11 AM), as shown in FIG. 7.

The graphical indication of the upcoming regulatory violation deadline intuitively and preemptively reminds the commercial vehicle driver or a fleet operations quality controller that an action (i.e. taking a rest, shifting duty with another driver, performing a legally-required vehicle maintenance task, etc.) needs to be taken in the near future. This preemptive reminder feature of the ELD HoS audit and correction guidance system further reduces unnecessary and undesirable regulatory violation notices for commercial vehicle fleet operations that may face sanctions and/or hefty penalties, if legally-mandated regulatory rules for commercial vehicle operations are violated inadvertently by one or more drivers, contractors, or other employees.

Figure 8:
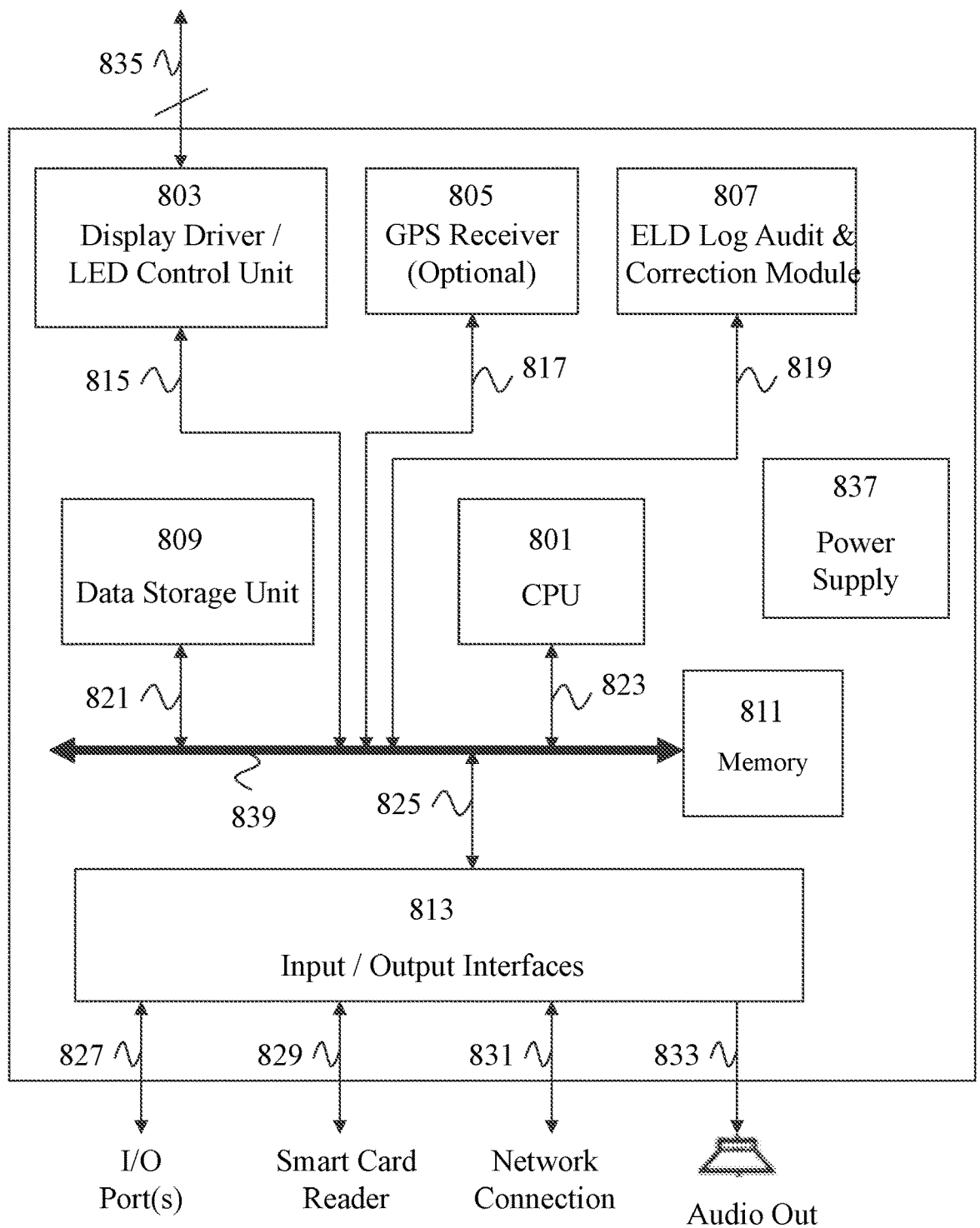
FIG. 8 shows a system block diagram example for a vehicle electronic logging device (ELD), in accordance with an embodiment of the invention.

FIG. 8 shows a system block diagram example (800) for a vehicle electronic logging device (ELD), which is a component in a commercial fleet-level ELD HoS audit and correction guidance system, in accordance with an embodiment of the invention. In this system block diagram example (800), the vehicle ELD (e.g. 121 of FIG. 1) includes a CPU (801), a memory unit (811), a data storage unit (809), a display driver and/or LED control unit (803), an ELD log audit and correction module (807), an input/output interfaces (813), and a power supply (837). Optionally, the vehicle ELD also has a global positioning system (GPS) receiver (805).

Figure 9:
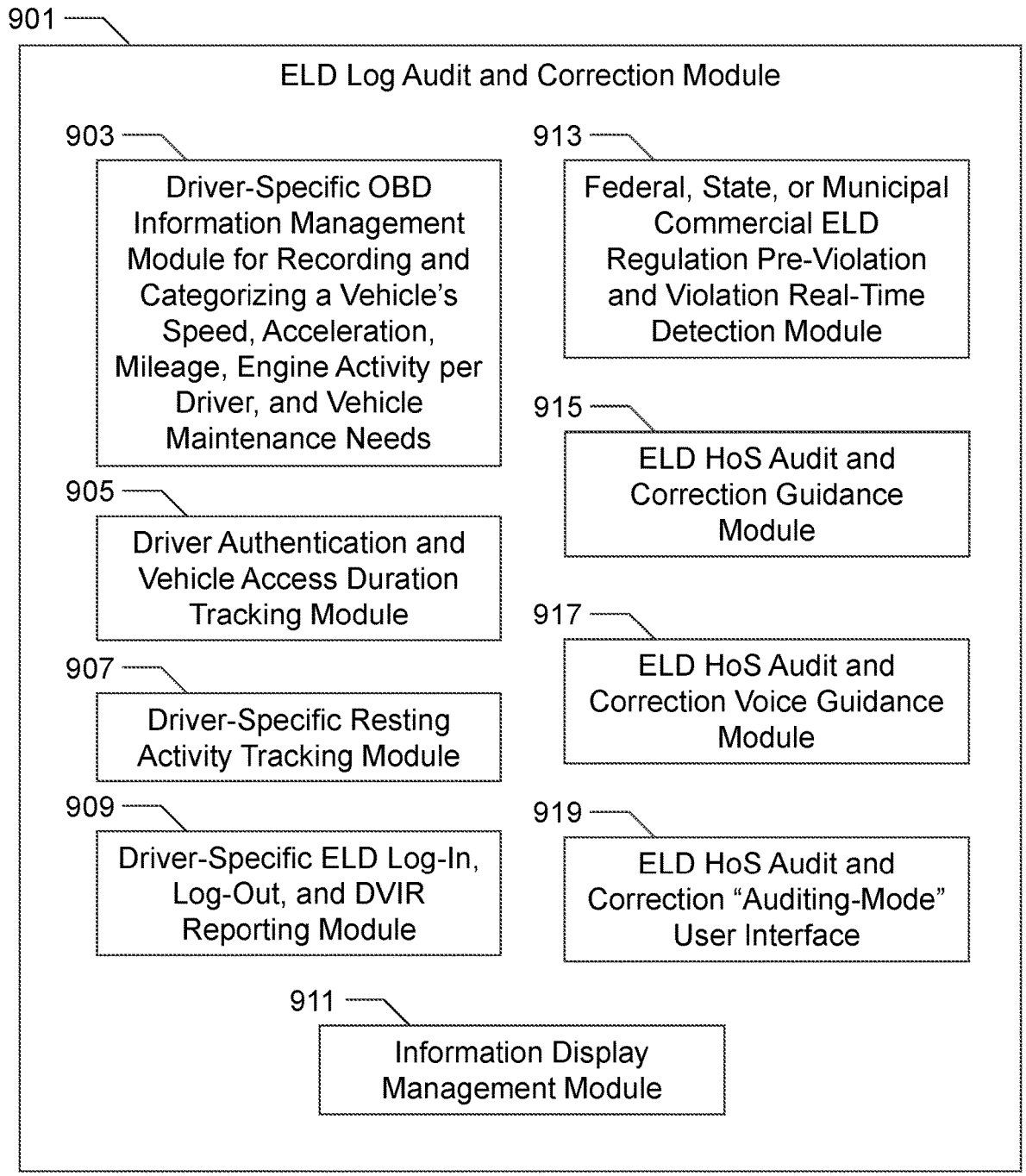
FIG. 9 shows an ELD log audit and correction module in an ELD HoS audit and correction guidance system, in accordance with an embodiment of the invention.

In one embodiment of the invention, these hardware system blocks (e.g. 800) for the vehicle ELD are configured to execute the ELD log audit and correction module (807) in the CPU (801) and the memory unit (811), wherein the ELD log audit and correction module (807) contains a plurality of logical blocks, as exemplified by FIG. 9. In another embodiment of the invention, the ELD log audit and correction module (807) may be hard-coded into a semiconductor chip as a hardware component within the hardware system blocks of the vehicle ELD (e.g. 121 in FIG. 1). Furthermore, the vehicle ELD may also incorporate a wireless transceiver for ELD and OBD data communication with a plurality of portable electronic devices and a commercial fleet vehicle maintenance and ELD database management system via a wireless data network. Alternatively, the vehicle ELD may be operatively connected to a separate wireless transceiver unit for ELD and OBD data communication with various components of the commercial fleet-level ELD HoS audit and correction guidance system. The wireless transceiver may be configured to transmit or receive data packets via a cellular network, a satellite network, a land-mobile radio network, or via another wireless communication method.

Continuing with FIG. 8, the data storage unit (809) in the vehicle ELD can store OBD data streams from a vehicle OBD device and any information entered by a time-sharing vehicle driver or a commercial fleet operation personnel. Furthermore, the ELD log audit and correction module (807) executed in the vehicle ELD can retrieve the OBD data streams, environmental sensor readings associated with the time-shared vehicle, and other driver activity-related information to calculate and/or determine current status of a vehicle repair/maintenance need or a specific driver activity (e.g. actively driving, passively idling, resting, signing off from an on-duty status, etc.). For example, vehicle speed, acceleration, engine on/off status, driver position/location sensing within the time-shared vehicle (e.g. driver's seat, passenger seat, sleeper cabin, outside the vehicle, etc.), and other vehicle OBD and sensor output parameters can be utilized by the ELD log audit and correction module (807) to determine the current status of specific driver activities, from which one or more pre-violation or violation alerts and voice and/or visual audit-mode and log content correction guidance can be generated to encourage timely amendments to potentially-erroneous vehicle ELD log entries.

In some embodiments of the invention, the vehicle OBD and sensor output parameters may also be utilized to detect a potential damage or endangerment to a fragile cargo item, excessively cold or hot temperatures inside the time-shared vehicle, extreme humidity or dryness in the time-shared vehicle's cargo space, or excessive fuel consumption by a particular driver. Any of these detected information during a particular driver's operating hours may be synthesized and recorded as part of the driver-specific ELD log, if desired by the commercial fleet operation personnel or government regulators.

In some instances, the vehicle ELD may integrate or connect to location tracking unit(s), such as the GPS receiver (805) in FIG. 8. An abrupt outage or improper GPS coordinate readings for the time-shared vehicle from the GPS receiver (805) or another location tracking unit may indicate a potential endangerment to the currently logged-in driver, which can be detected and alerted to the commercial fleet operation personnel or the government regulators via a wireless data network. The ELD log audit and correction module (807) can be configured to generate textual, aural, or multimedia alerts to the currently logged-in driver, the commercial fleet operation personnel, and/or the government regulators, based on alerts determined by the vehicle ELD.

Furthermore, the vehicle ELD may also generate alerts or indicate monitoring statuses via a plurality of LED indicator lights connected to the display driver and/or LED control unit (803) and a display driver output (835). Moreover, various hardware components (i.e. 801, 803, 805, 807, 809, 811, 813, 837) of the vehicle ELD can transmit and receive data among each other via an internal bus (839) and various electrical connections (815, 817, 819, 821, 823, 825).

In the embodiment of the invention as shown in FIG. 8, the vehicle ELD also includes the power supply unit (837), which supplies electrical power to various hardware components (i.e. 801, 803, 805, 807, 809, 811, 813, 837) in the hardware system blocks of the vehicle ELD. Furthermore, the vehicle ELD may also include the input/output interfaces (813) that can accommodate data communication for I/O ports (827), smart card readers (829), network connections (831), and an audio out connection (833) to a speaker. As shown in the system block diagram example (800), in this embodiment of the invention, the input/output interfaces (813) are operatively connected to the internal bus (839), which can communicate with any other components in the vehicle ELD.

FIG. 9 shows an example (900) of an ELD log audit and correction module (901) in an ELD HoS audit and correction guidance system, in accordance with an embodiment of the invention. In a preferred embodiment of the invention, the ELD log audit and correction module (901) corresponds to element 807 in FIG. 8. The ELD log audit and correction module (901) is typically integrated into a vehicle electronic logging device (ELD), which is typically a vehicle-installed specialized hardware device that connects to a vehicle OBD device and an ELD/OBD data transceiver unit, as previously shown in FIG. 1.

In a preferred embodiment of the invention, the ELD log audit and correction module (901) comprises a driver-specific OBD information management module (903) for recording and categorizing a vehicle's speed, acceleration, mileage, engine activity, OBD fault codes, and vehicle repair/maintenance-related output parameters per driver. An OBD data stream which contains vehicular dynamics, engine on/off statuses, OBD fault codes (if any), and fuel consumption information can be stored, categorized, and extracted in the driver-specific OBD information management module (903).

The ELD log audit and correction module (901) also includes a driver authentication and vehicle access duration tracking module (905). This module is configured to authenticate a particular driver operating a time-shared vehicle among a plurality of registered drivers in the vehicle ELD, and is also configured to track and record the particular driver's vehicle access duration and any vehicle OBD fault codes or maintenance needs. The particular driver's vehicle access duration may be inferred by the driver authentication timing with the vehicle ELD, speedometer readings, and engine on/off statuses that suggest the particular driver's on-duty driving activities or resting periods. Furthermore, the particular driver's vehicle access duration can be made more precise by manual or machine-based automated entry of the particular driver's expected operating hours in the time-shared vehicle.

Furthermore, the ELD log audit and correction module (901) also incorporates a driver-specific resting activity tracking module (907), which is configured to determine, track, and record a driver's resting periods based on machine-generated vehicle data parameters, such as motion sensor values in the sleeper cabin, driver authentication timing with the vehicle ELD, speedometer readings, engine on/off statuses, and driver operation schedule entries. In addition, the driver's resting periods can be tracked more accurately if the driver's expected resting schedules are uploaded to the driver-specific resting activity tracking module (907).

Continuing with FIG. 9, the ELD log audit and correction module (901) also incorporates a driver-specific ELD log-in, log-out, and DVIR reporting module (909), which is capable of initiating (i.e. "logging in"), terminating (i.e. "logging out" or signing off), and/or transferring (i e "handover") a driver-specific ELD or DVIR log generation privileges in the vehicle ELD. A plurality of drivers who time-share a vehicle can utilize one or more portable electronic devices and corresponding remote ELD/DVIR log handover mobile applications to request, grant, or deny a driver-specific ELD/DVIR log handover for the vehicle ELD installed in the time-shared vehicle, even when a particular driver has forgotten to log out of the vehicle ELD after his or her allotted driving operation period and is no longer near the time-shared vehicle.

Moreover, the ELD log audit and correction module (901) also incorporates a federal, state, or municipal commercial ELD regulation pre-violation and violation real-time detection module (913) that compares the most up-to-date regulatory violation rules from various local, state, and national governments against recent log entries into a vehicle ELD log. If there is an existing or upcoming violation of a regulatory requirement based on the past or the current trends and entries in the vehicle ELD log, the federal, state, or municipal commercial ELD regulation pre-violation and violation real-time detection module (913) generates a violation or pre-violation alert in form of visual, aural, textual, email, or a combination thereof to prompt a driver or a fleet operations controller to perform timely correction to the vehicle ELD log before the data contents are frozen (e.g. 24 hours after each entry in the vehicle ELD log, etc.) from additional amendments due to regulatory vehicle log lock-up requirements.

Furthermore, the ELD log audit and correction module (901) also contains an ELD HoS audit and correction guidance module (915) configured to generate and manage various driver auditing-mode interfaces (e.g. 919) and vehicle operations quality controller auditing-mode or editing-mode interfaces, wherein each interface graphically and/or aurally guides system users on a step-by-step basis for intuitive and convenient usability. The ELD HoS audit and correction guidance module (915) also operates in conjunction with an ELD HoS audit and correction voice guidance module (917) to provide a dynamically-adaptive voice guidance assistance to the system user for each step required in vehicle log entry amendment or correction procedures. In some cases, the dynamically-adaptive voice guidance assistance improves log entry correction response time and compliance rates by proactively and verbally encouraging log entry corrections before a regulatory violation is triggered.

In addition, the ELD log audit and correction module (901) also includes an information display management module (911). The information display management module (911) is configured to display, highlight, and modify ELD log timelines, ELD log entries, violation alerts, driving activity statuses, and other information pertinent to the ELD HoS audit and correction guidance system. Furthermore, these graphical and textual information associated with the vehicle ELD can also be displayed by the commercial fleet-level multiple vehicle ELD log and database management system.

In one embodiment of the invention, various modules (903, 905, 907, 909, 911, 913, 915, 917, 918) contained inside the ELD log audit and correction module (901) may be software elements that are executed in a CPU/APU or a memory unit of a hardware device, such as system block components (e.g. 800 of FIG. 8) of a vehicle electronic logging device (ELD). In another embodiment of the invention, the ELD log audit and correction module (901) may be a combination of software elements and hardware elements that conceptually constitute various components (903, 905, 907, 909, 911, 913, 915, 918) of the ELD log audit and correction module (901). Yet in another embodiment of the invention, the ELD log audit and correction module (901) may be entirely implemented into a semiconductor chip, which makes the ELD log audit and correction module (901) a system-on-chip (SoC) hardware solution.

Figure 10:
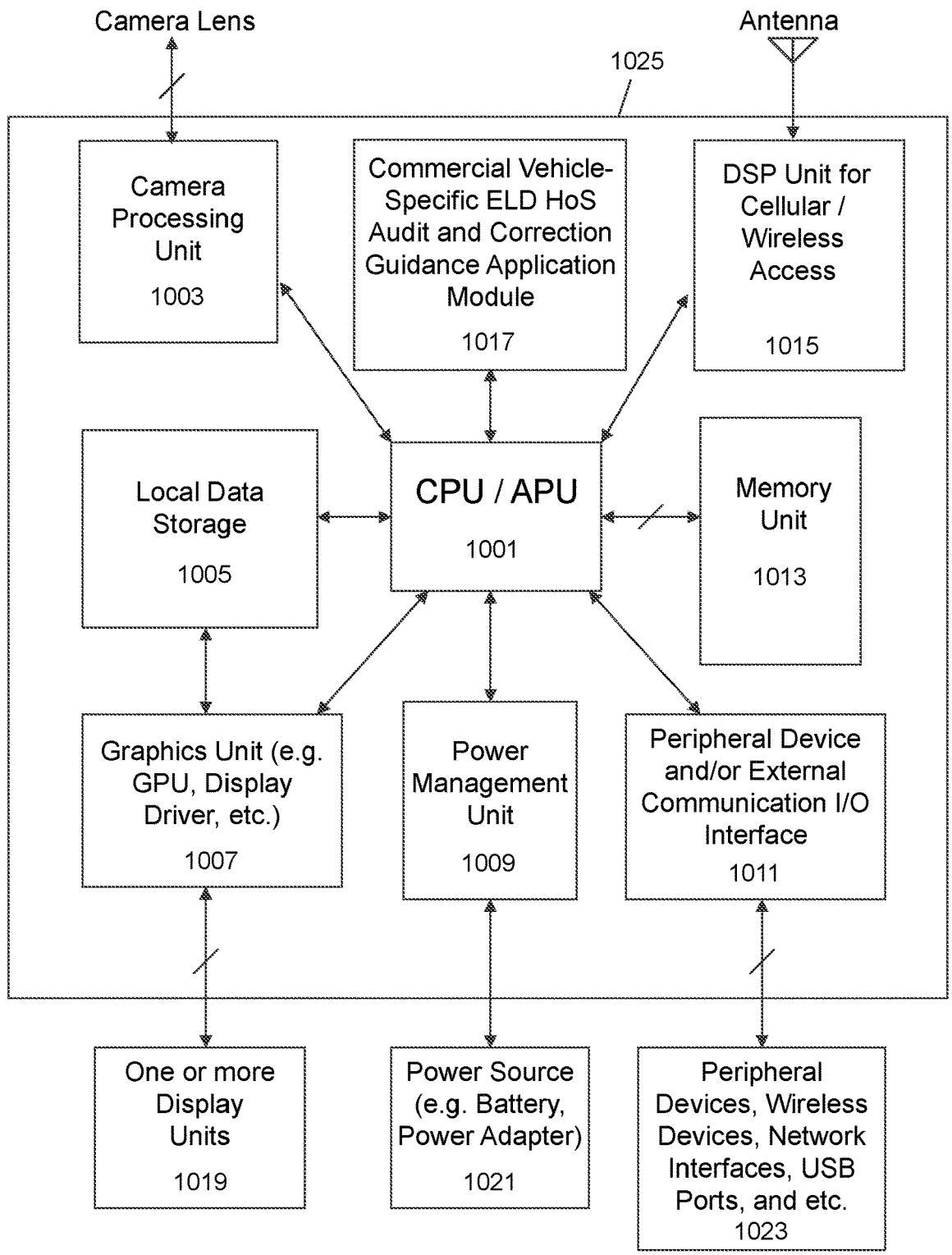
FIG. 10 shows an example of a portable electronic device incorporating a commercial vehicle-specific ELD HoS audit and correction guidance application, in accordance with an embodiment of the invention.

FIG. 10 shows an example of a portable electronic device (1000) incorporating a commercial vehicle-specific ELD HoS audit and correction guidance application module (1017), in accordance with an embodiment of the invention. The commercial vehicle-specific ELD HoS audit and correction guidance application module (1017) contains at least one of a commercial vehicle-specific ELD HoS audit and correction application, an in-vehicle ELD HoS audit and correction guidance application, and a commercial fleet-level multiple vehicle ELD HoS audit and correction management application, each of which is configured to guide or manage corrective steps in reducing inadvertent errors in ELD driver logs.

In a preferred embodiment of the invention, the portable electronic device may be a smart phone, a tablet computer, a notebook computer, a personal computer, a special-purpose proprietary ELD data controller device, or another transportable electronic device that can execute a vehicle ELD rule compliance and inspection voice assistant application in a CPU, an APU, and/or a memory unit of the portable electronic device. The commercial vehicle-specific ELD HoS audit and correction guidance application module (1017) may comprise software elements (e.g. a vehicle ELD rule compliance and inspection voice assistant mobile app) stored in a non-volatile data storage, or embedded software elements hard-coded and incorporated in a semiconductor chip as a piece of hardware. The portable electronic device is configured to provide vehicle ELD rule compliance and inspection voice assistant user interfaces for creating, modifying, authorizing, and sharing vehicle ELD log files, and may also function as a multi-purpose electronic communication device that provides Internet web browsing, text messaging, email communication, and voice call capabilities.

As shown in the system block diagram example (1000) of FIG. 10, the portable electronic device has a CPU or an APU (1001), which is operatively connected to a memory unit (1013), a local data storage (1005), a camera processing unit (1003), a graphics unit (1007) (e.g. a graphics processor, a display driver, and etc.), a power management unit (1009), a peripheral device and/or external communication I/O interface (1011), a digital signal processing (DSP) unit for cloud server access (1015), the commercial vehicle-specific ELD HoS audit and correction guidance application module (1017), and a sound unit. These logical units may be placed on a single printed circuit board (1025) in one embodiment of the invention, or a plurality of printed circuit boards in another embodiment of the invention.

In the preferred embodiment of the invention, the CPU/APU (1001) is configured to control each logical unit operatively (i.e. directly or indirectly) connected to the CPU/APU (1001). The memory unit (1013) typically comprises volatile memory banks based on DRAM's. In some embodiments of the invention, the memory unit (1013) may use non-volatile memory technologies such as SRAM's and/or Flash memory. The memory unit (1013) is capable of storing programs and applications which can be executed by the CPU/APU (1001), the graphics unit (1007), or another logical unit operatively connected to the memory unit (1013).

In particular, in the preferred embodiment of the invention, instructions, datasets, and codes originating from the commercial vehicle-specific ELD HoS audit and correction guidance application module (1017) can be executed on the CPU/APU (1001) and the memory unit (1013) of the portable electronic device to provide ELD HoS audit and correction guidance mobile applications. The commercial vehicle-specific ELD HoS audit and correction guidance application module (1017) may be a separate standalone logical unit, as shown in FIG. 10, or a collection of software or machine codes associated with the commercial vehicle-specific ELD HoS audit and correction guidance application in the local data storage (1005). Preferably, the commercial vehicle-specific ELD HoS audit and correction guidance application module (1017) contains one or more logical units (e.g. 903, 905, 907, 909, 911, 913, 915, 917, 919) previously described in FIG. 9.

Continuing with FIG. 10, any software and programs executed on the CPU/APU (1001) and the memory unit (1013) of the portable electronic device may be part of an operating system, or a separate application installed on the operating system of the portable electronic device. Furthermore, the camera processing unit (1003) is operatively connected to a camera lens on the portable electronic device, and is able to process image-related data from the camera lens in association with the CPU/APU (1001) and/or other logical units in the portable electronic device to produce live recorded video information, which may be stored in the local data storage (1005). In addition, a microphone operatively connected to the sound unit can produce live recorded audio information, which can also be stored in the local data storage (1005).

Moreover, as shown in FIG. 10, the digital signal processing (DSP) unit for cloud server access (1015) is operatively connected to an radio frequency (RF) antenna. The DSP unit for cloud server access (1015) is generally configured to receive and transmit radio data and/or voice signals wirelessly for a desktop computer, a laptop, a mobile communication device, an electronic goggle, or another suitable electronic system. In addition, the power management unit (1009) is operatively connected to a power supply unit and a power source (e.g. battery, power adapter) (1021), and the power management unit (1009) generally controls power supplied to the portable electronic device and its logical units. Moreover, the peripheral device and/or external communication I/O interface (1011) as shown in FIG. 10 can be operatively connected to one or more peripheral devices, wireless devices, USB ports, and other external data communication media (1023).

Continuing with FIG. 10, in the preferred embodiment of the invention, the graphics unit (1007) in the system block diagram example (1000) for the portable electronic device comprises a graphics processor, a display driver, a dedicated graphics memory unit, and/or another graphics-related logical components. In general, the graphics unit (1007) is able to process and communicate graphics-related data with the CPU/APU (1001), the display driver, and/or the dedicated graphics memory unit. The graphics unit (1007) is also operatively connected to one or more display units (1019). In addition, the CPU/APU (1001) may be operatively connected to the sound unit which contains audio-related logical components for generation or recording of audio data from a microphone operatively connected to the portable electronic device.

Various embodiments of the present invention provide several key advantages over conventional methods of regulatory compliance in commercial vehicle operations. One advantage of an embodiment of the present invention is providing a novel commercial fleet-level ELD log audit and correction guidance system that proactively identifies potentially-erroneous or incorrect driver activity log entries in real time and reduces regulatory violations by encouraging timely corrections of erroneous log entries via an intuitive log entry audit and correction interface, multimedia alerts, and intelligent voice guidance to commercial vehicle drivers and fleet operation managers.

Furthermore, another advantage of an embodiment of the present invention is providing a dynamically-adaptable intelligent voice assistant incorporated into the novel commercial fleet-level ELD log audit and correction guidance system to generate proactive voice guidance through log entry audit and correction modes and user interfaces, which in turn improves usability and correction response rates by commercial vehicle drivers and fleet operation managers.

In addition, another advantage of an embodiment of the present invention is providing a novel commercial fleet-level ELD log audit and correction guidance system that determines, warns, or reports chronically-inaccurate and "problematic" commercial vehicle drivers or commercial vehicles that cause repeated and inaccurate driver log entries, which in turn minimizes regulatory penalties and optimizes commercial vehicle operational efficiencies.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A commercial fleet-level electronic logging device (ELD) log audit and correction guidance system comprising:
   a vehicle on-board diagnostics (OBD) device connected to an engine control unit (ECU) or a vehicular control chip in a vehicle to record, diagnose, and generate an engine on or off status, vehicle speed data, acceleration and deceleration data, ambient air temperature data, and OBD fault codes as a raw OBD data stream;
   a vehicle electronic logging device (ELD) connected to the vehicle OBD device, wherein the vehicle ELD is configured to generate a driver-specific ELD log that contains a currently logged-in driver's on-duty, off-duty, and resting activities associated with the vehicle;
   an ELD and OBD data transceiver connected to the vehicle ELD, wherein the ELD and OBD data transceiver is configured to transmit ELD and OBD data to components of the commercial fleet-level ELD log audit and correction guidance system that are located outside the vehicle;
   a commercial vehicle-specific ELD log audit and correction guidance application executed in a first portable electronic device for the currently logged-in driver, wherein the commercial vehicle-specific ELD log audit and correction guidance application detects and identifies a potential error in the driver-specific ELD log that contains the currently logged-in driver's on-duty, off-duty, and resting activities associated with the vehicle, and also creates a pre-violation alert triggered by an anomalous log element that urgently requires the currently logged-in driver's immediate attention for timely amendment to prevent a federal, state, or municipal violation notice related to a mandatory driver rest requirement, a substitute driver requirement, a speed limit requirement, a vehicle maintenance requirement, or another regulatory requirement for commercial drivers, wherein the commercial vehicle-specific ELD log audit and correction guidance application also generates a driver auditing-mode interface and an interactive voice guidance to prompt the currently logged-in driver to correct the potential error to avoid a regulatory violation;

a commercial fleet-level multiple vehicle ELD log and database management system that analyzes, stores, and categorizes a plurality of driver-specific ELD logs for a plurality of drivers and vehicles in a commercial fleet operation; and a data communication network configured to provide a wireless data information transfer among the vehicle ELD, the ELD and OBD data transceiver, the first portable electronic device, and the commercial fleet-level multiple vehicle ELD log and database management system.

2. The commercial fleet-level electronic logging device (ELD) log audit and correction guidance system of claim 1, further comprising an in-vehicle ELD log audit and correction guidance application executed in an in-vehicle display connected to the vehicle ELD.

3. The commercial fleet-level electronic logging device (ELD) log audit and correction guidance system of claim 1, further comprising a commercial fleet-level multiple vehicle ELD log audit and correction management application executed in a portable or stationary electronic device for a vehicle fleet monitoring station.

4. The commercial fleet-level electronic logging device (ELD) log audit and correction guidance system of claim 1, further comprising a computer server with a CPU and a memory unit that execute the commercial fleet-level multiple vehicle ELD log and database management system.

5. The commercial fleet-level electronic logging device (ELD) log audit and correction guidance system of claim 3, wherein at least one of the commercial fleet-level multiple vehicle ELD log audit and correction management application and the commercial fleet-level multiple vehicle ELD log and database management system is able to identify, alarm, or report a commercial vehicle driver who repeatedly creates or enters erroneous data parameters into the driver-specific ELD log, which in turn triggers repeated regulatory violations.

6. The commercial fleet-level electronic logging device (ELD) log audit and correction guidance system of claim 1, further comprising in-vehicle sensors and the engine control unit (ECU) that are operatively connected to the vehicle OBD device.

7. The commercial fleet-level electronic logging device (ELD) log audit and correction guidance system of claim 1, wherein the vehicle ELD comprises a CPU, a memory unit, an ELD log audit and correction module, a data storage unit, a power supply, and input and output interfaces.

8. The commercial fleet-level electronic logging device (ELD) log audit and correction guidance system of claim 7, wherein the ELD log audit and correction module comprises a driver-specific OBD information management module for recording and categorizing the vehicle's speed, acceleration, mileage, engine activity, and vehicle maintenance needs per driver, a driver authentication and vehicle access duration tracking module, a driver-specific resting activity tracking module, a driver-specific ELD log-in, log-out, and DVIR reporting module, a federal, state, or municipal commercial ELD regulation pre-violation and violation real-time detection module, an ELD log audit and correction guidance module, an ELD log audit and correction voice guidance module, an ELD log audit and correction "auditing-mode" user interface, and an information display management module.

9. The commercial fleet-level electronic logging device (ELD) log audit and correction guidance system of claim 1, wherein the first portable electronic device is a smart phone, a tablet computer, a notebook computer, a personal computer, or a specialized driving activity communication device.

10. The commercial fleet-level electronic logging device (ELD) log audit and correction guidance system of claim 1, wherein the vehicle is a truck, a van, a bus, a taxi, a limousine, or a passenger vehicle, which is time-shared among the plurality of drivers.

11. The commercial fleet-level electronic logging device (ELD) log audit and correction guidance system of claim 1, wherein the data communication network is a cellular communication network, a satellite communication network, a land-mobile radio communication network, a wireless local area network, or a combination thereof.

12. The commercial fleet-level electronic logging device (ELD) log audit and correction guidance system of claim 3, wherein the commercial vehicle-specific ELD log audit and correction guidance application, an in-vehicle ELD log audit and correction guidance application, and the commercial fleet-level multiple vehicle ELD log audit and correction management application are each configured to process and recognize voice commands.

* * * * *